Figure 1:
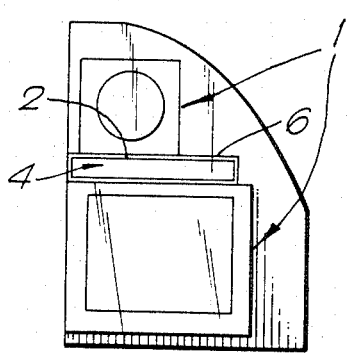

United States Patent [19]

Owen et al.

[11] Patent Number: 4,529,150
[45] Date of Patent: Jul. 16, 1985

[54] CONSOLE ASSEMBLIES FOR CONTROL STATIONS

[75] Inventors: James B. Owen; Peter R. Wilkinson, both of Preston, England

[73] Assignee: British Aerospace Public Limited Company, London, England

[21] Appl. No.: 508,107

[22] Filed: Jun. 27, 1983

[30] Foreign Application Priority Data

Jun. 30, 1982 [GB] United Kingdom ............... 8218868
Mar. 26, 1983 [GB] United Kingdom ............... 8308411

[51] Int. Cl.³ .................... B64D 47/00; G01P 1/02
[52] U.S. Cl. .......................... 244/1 R; 244/118.5; 244/129.1; 73/431; 73/432 AD
[58] Field of Search ............. 244/1 R, 118.5, 129.1; 248/27.1, 447, 240, 240.1; 73/432 AD, 431; 116/DIG. 43, 300; D12/192; 108/45

[56] References Cited

U.S. PATENT DOCUMENTS

| | | | |
|---|---|---|---|
| 2,522,602 | 9/1950 | Burns | 108/45 |
| 2,845,315 | 7/1958 | McCoy | 108/45 |
| 3,040,698 | 6/1962 | Gray | 116/300 |
| 3,542,315 | 11/1970 | Eberl et al. | 244/1 R |
| 3,606,112 | 9/1971 | Cheshier | 108/45 |
| 3,855,961 | 12/1974 | Schadow | 116/300 |
| 3,952,249 | 4/1976 | Colman | 73/431 |
| 4,423,631 | 1/1984 | Dold | 74/431 |

Primary Examiner—Trygve M. Blix
Assistant Examiner—Rodney Corl
Attorney, Agent, or Firm—Cushman, Darby & Cushman

[57] ABSTRACT

A console assembly, suitable for example, for an aircraft cockpit, including a fixed structure, having a display area (1) permanently presented to, for example, a crew member, a movable panel (2) having a flat face region (3) and a flat edge region (4), both of rectangular form, the edge region being of substantially less area than the face region, a recess (5) in the fixed structure with a mouth (6) formed in the permanently presented display area (1), mounting means (7, 10) mounting the movable panel (2) on the fixed structure (1) for movement between a stowed position in which the movable panel (2) lies within the recess (5) with its edge region (4) presented to the crew member at said recess mouth (6), and a display position in which its face region (3) is presented to the crew member in front of the permanently presented display (1).

5 Claims, 19 Drawing Figures

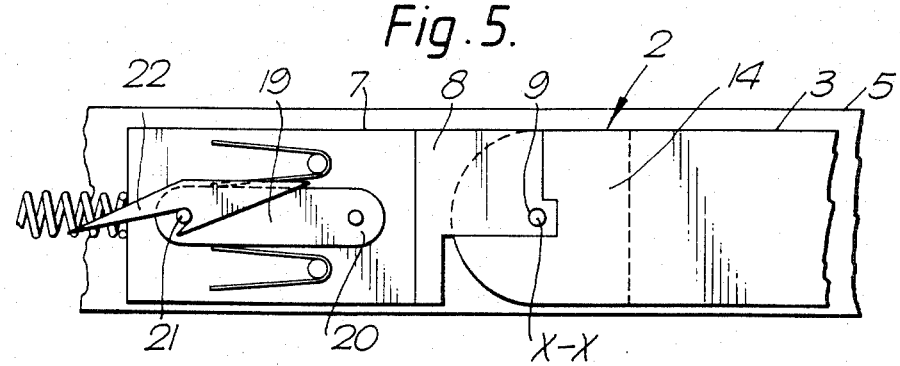
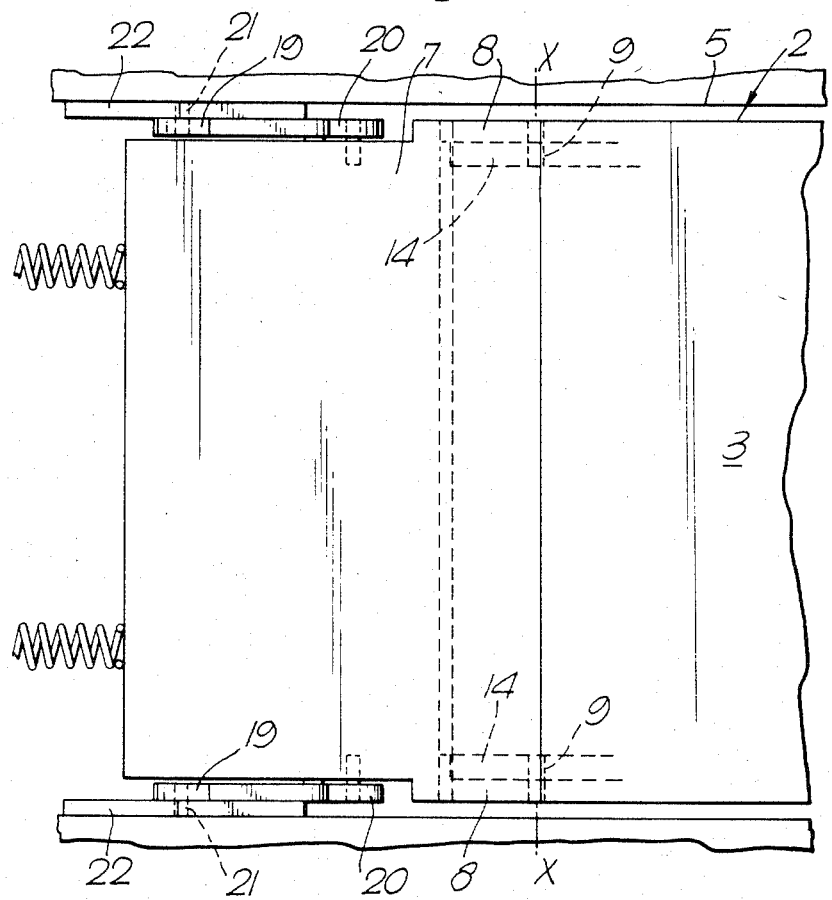

CONSOLE ASSEMBLIES FOR CONTROL STATIONS

This invention relates to console assemblies where display areas are required to be viewable and/or accessible by a person requiring information and/or to effect control. The term "display area" includes areas which can accommodate both output displays (for example instruments or screens) and input displays (for example switches or buttons). Naturally, the former require only to be viewable whilst the latter require to be accessible as well.

In some situations, it is unnecessary or undesirable to have a permanently presented display area and thus some form of temporarily presented display must be used. In others, a permanently presented display area is necessary, but the area available is insufficient making some form of temporarily presented display area necessary.

The former case is exemplified by an aircraft maintenance station where a display area is required to be readily viewed and/or accessed only when the aircraft is on the ground and after use must take up as little space as possible. It certainly must not protrude from the aircraft contour. Thus, one object of the invention is to provide a display console in which a display area can be temporarily presented for viewing and/or access and which after use can be stowed away.

The latter case is exemplified by an aircraft cockpit or flight deck where it is necessary and usual to have a permanently presented display area but where it is often desirable to have an extra display area temporarily available since the area available for a permanently presented display is strictly limited. Situations where the availability of temporary extra area is useful are where the display area is used at certain times only, for example in aircraft where certain checks must be made before flight or post flight, or in an emergency where the permanently presented display fails and a temporarily presented display can provide sufficient data to enable the aircraft to be flown home.

Hitherto, such extra display areas have encroached upon those permanently presented with attendant crowding making all the displays difficult to read and access.

A further object of the present invention is thus to provide a display console in which a temporary display area can be presented when necessary, or when desired but which, when not so presented, does not significantly encroach on that area available for the permanent display.

Yet a further objective is to provide a display console which presents a permanent display area with a temporary display area which is not only readily available for use, for example in an emergency, but also can be readily stowed after use. Moreover, it can lie in front of the permanently presented display area during such use.

According to one aspect of the invention, a console assembly arranged to present a display area to a person requiring information and/or to effect control includes a fixed structure, a movable panel having a face region and an edge region, the edge region being of substantially less area than the face region, mounting means mounting the movable panel on the fixed structure for movement between a stowed position in which only the edge region is directed for presentation to a display position in which the face region is presented, thereby providing a temporary display area.

Preferably, the mounting means includes guideway means carried by the fixed structure, carriage means permanently engaging said guideway for back and forth movement with respect to the fixed structure, and pivot means connecting the movable panel to the carriage means such that during movement from the stowed to the display position, the movable panel initially moves bodily with the carriage means and subsequently swings with respect to the carriage means and vice versa.

Figure 2:
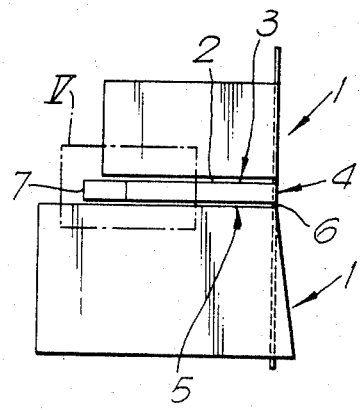
Figure 3:
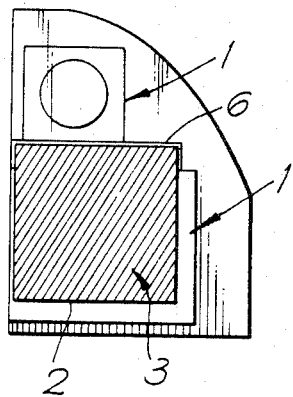
Figure 4:
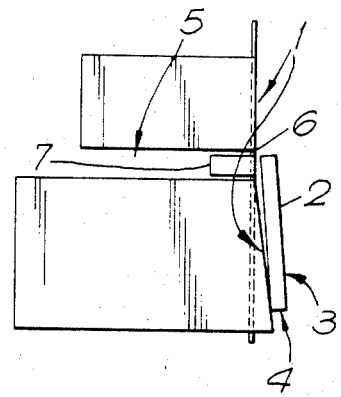
Figure 7:
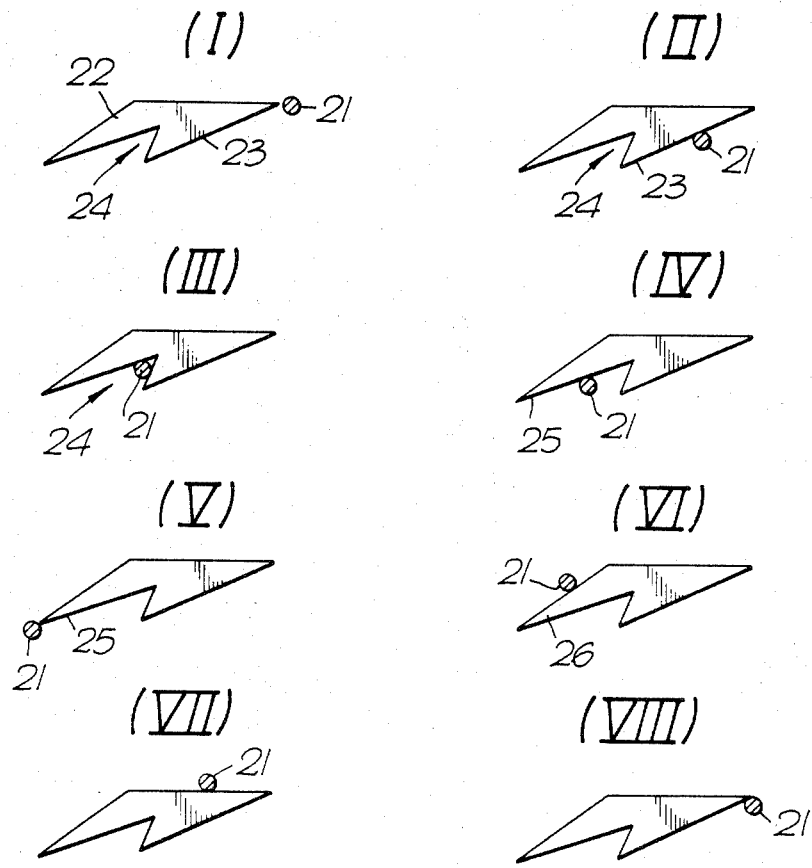
Figure 8:
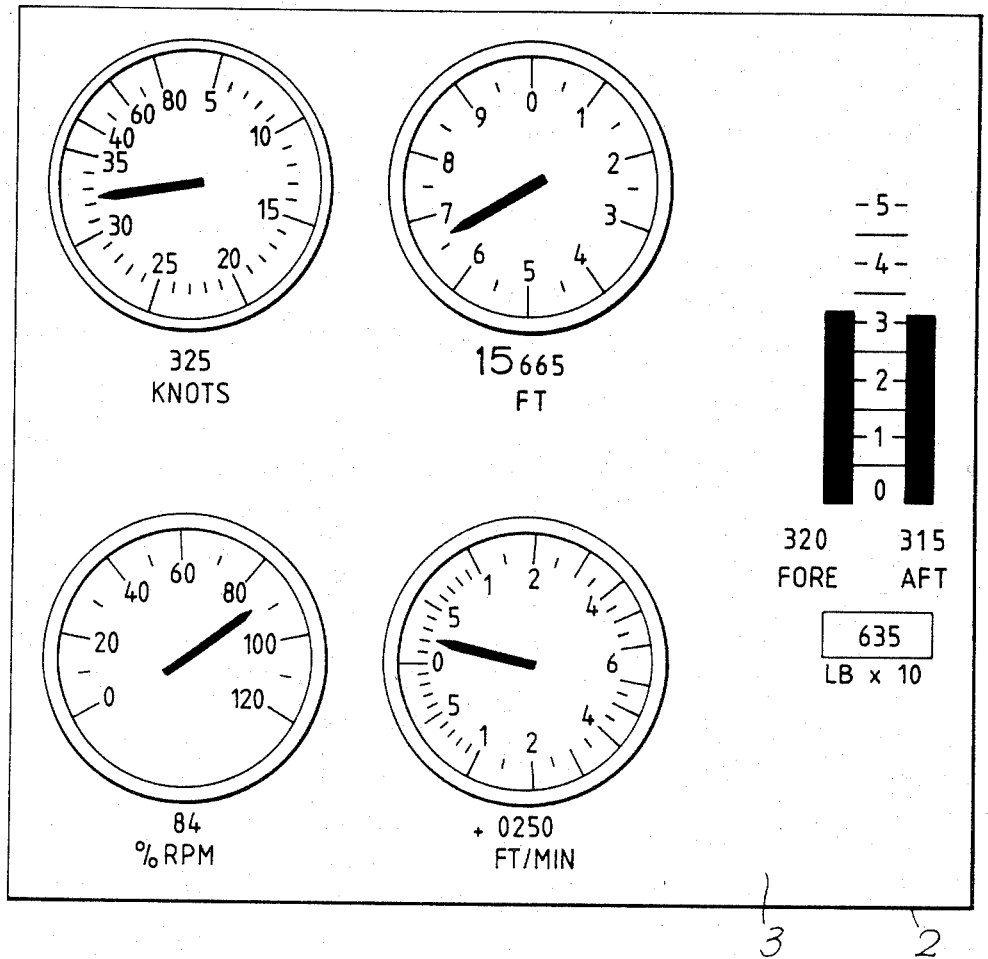
Figure 9:
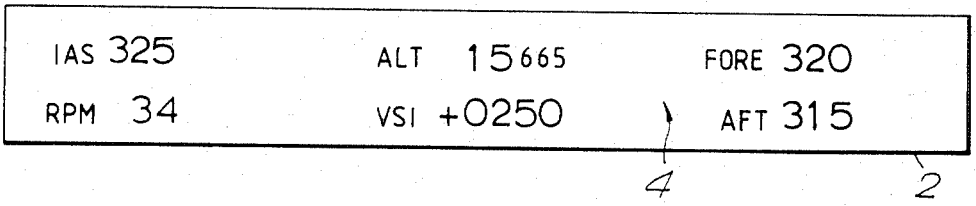
Figure 10:
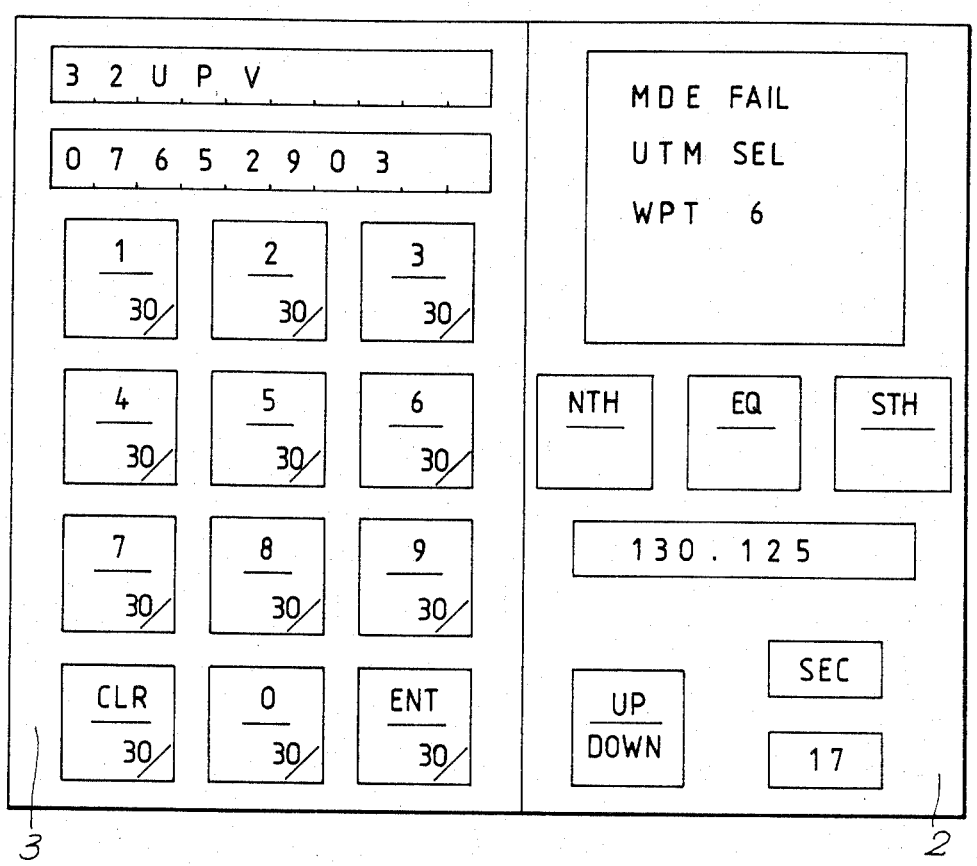
Figure 11:
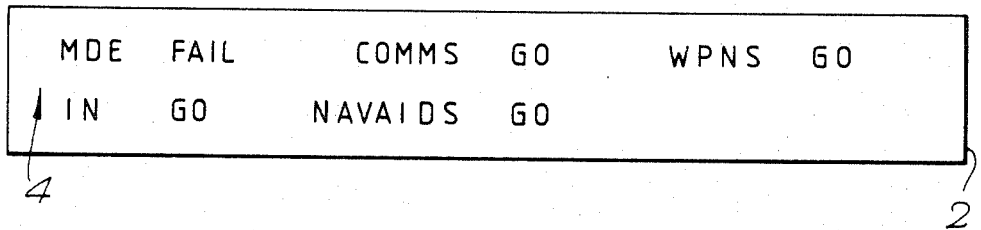
Figure 12:
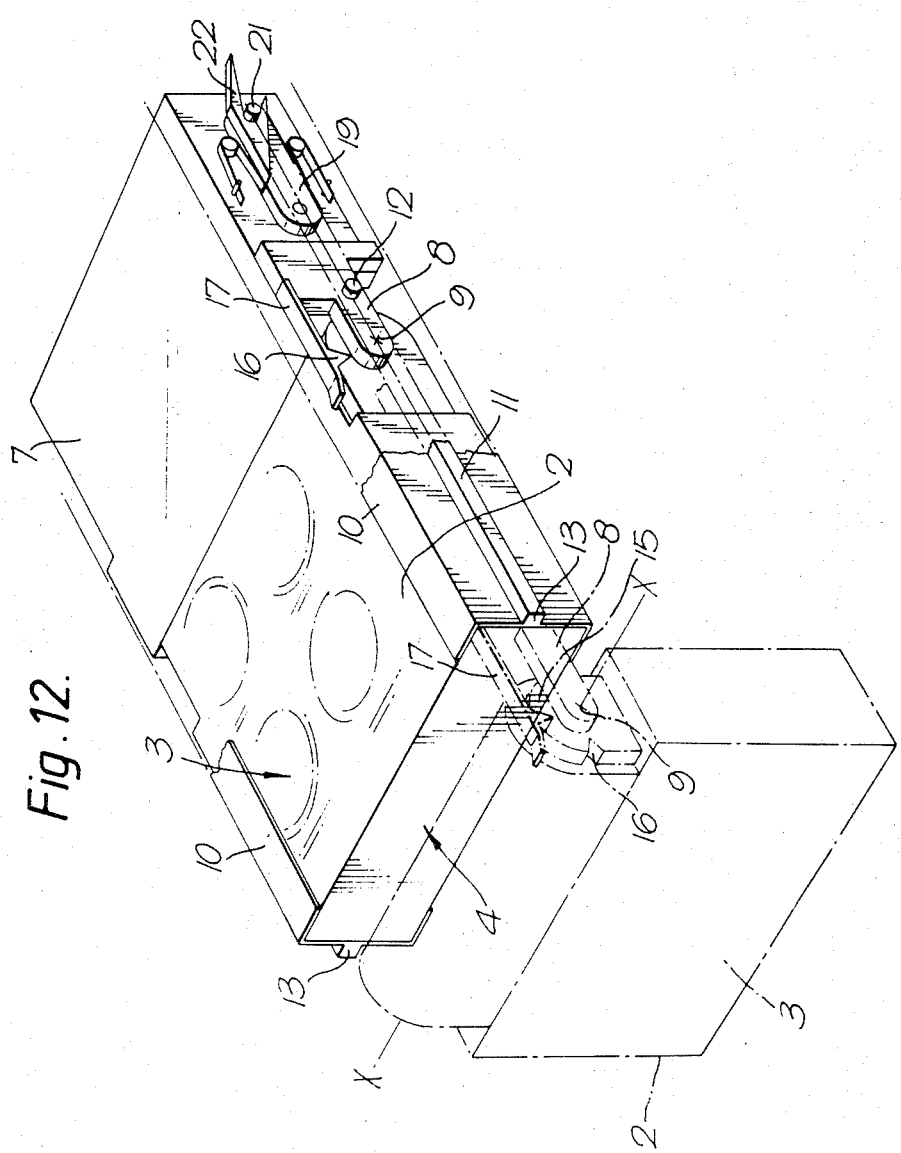

One embodiment of a console according to the present invention is described by way of example with reference to the accompanying drawings in which FIG. 1 is a front view of part of a console assembly suitable for an aircraft cockpit, FIG. 2 is a side view of FIG. 1, FIG. 3 is a front view similar to that of FIG. 1 but in a different condition, FIG. 4 is a side view of FIG. 3, FIG. 5 is an enlarged detail view of the region of box V of FIG. 1, FIG. 6 is a plan view of FIG. 5, FIGS. 7, (I) through (VIII) illustrate sequencing of the details of FIG. 5, FIGS. 8 and 9 illustrate output, that is to say information displays of one embodiment, FIGS. 10 and 11 illustrate input, that is to say control displays of another embodiment, and FIG. 12 is an isometric view of part of a console assembly In the Figures, a console assembly for an aircraft cockpit has a fixed structure permanently presenting a display area 1. As can be seen, there is insufficient permanent display area available to present any further displays without unduly encroaching upon the permanently presented display area. Any such encroachment with attendant crowding would make all the displays difficult to read and access.

Accordingly, a temporarily presented display area is provided. For the purposes of illustration this is shown with diagonal shading. The temporarily presented display area is carried upon a movable panel 2 having a relatively large face region 3 of rectangular form and a relatively small edge region 4 also of rectangular form. The edge region 4 is, for example, only about one-third or less than the area of the face region 3. The actual ratio depends upon the choice of the designer who would take into account such factors as the thickness of the panel necessary to accommodate information displays such as known liquid crystal, light emitting diodes and similar devices and/or control displays such as keys and buttons, the area necessary for temporary display and stowage, and also the necessity of utilizing the extra display area available on the edge region 4. By way of example, FIGS. 1 to 4 show the edge region 4 as only one-tenth of the area of the face region 2, whilst FIGS. 8-10 show the ratio as being about one-sixth, and FIG. 11 shows the ratio as about one-third. Irrespectively, a useful saving in display area is made.

Mounting means shown only generally in FIGS. 1-4 but in some detail in FIGS. 5-7 and 12 are provided so that in a stowed position (FIGS. 1 and 2, and in hard outline in FIG. 12) only the edge region 4 is presented. Thus, the console assembly requires the allocation of only a relatively small area of the permanently presented display for the movable panel since it lies edgewise to the direction of presentation. In the stowed position, the movable panel 2 is housed within a recess 5 formed in the fixed structure, the recess having a mouth 6 formed in the permanently displayed area.

The mounting means are further arranged such that the movable panel 2 can be moved from the stowed position to the presented position in which its face 3 is presented. (FIGS. 3 and 4 and in broken outline in FIG. 12). In this latter position, the movable panel swings to overlay a large portion of the permanently displayed area.

With particular reference to FIG. 12, the mounting means comprise carriage means formed by a hinge mounting member 7 of box-like form being conveniently the same width and depth as the movable panel itself. Extending forwardly from the member 7 are spaced arms 8 carrying spigots 9 which form a hinge about which the movable panel can swing about a transverse axis X—X.

The hinge mounting member 7 is carried within the recess and constrained to move to and fro therein by means of fore-and-aft extending guide channels 10. The guide channels 10 lie on opposite sides of the recess and are carried by the fixed structure. To prevent the hinge mounting member 7 from being withdrawn from the mouth of the recess, further opposed channel members 11 are provided on the channels 10. Into these channels 11 protrude outwardly directed spigots 12 on the member 7 which, when the member 7 approaches the recess mouth, engage stops 13 provided at the outer ends of the channels.

The movable panel is formed with spaced arms 14 which connect the panel to the hinge spigots 9 (only one is shown in FIG. 12 for simplicity). These arms are formed with an arcuate track with detent notches 15 and 16 respectively set at about 90° to one another. The mounting member carries cantilever springs 17 which engage one or other of the notches; if that referenced 15 is engaged, then the movable panel is held in tandem alignment with the mounting member so that entering, exiting and stowage within the recess can be accomplished; and when that referenced 16 is engaged the movable panel is held at about 90° to the hinge mounting member for presentation in the displayed position. Naturally, the movable panel is only able to be rotated angularly when fully out of the recess. To ensure locking and release from the stowed position, a suitable mechanism is provided. This is particularly described with reference to FIGS. 5, 6 and 7. Each side face of the hinge mounting member 7 carries a lever arm 19 pivoted at one end 20 about a transverse axis, so that it lies alongside its associated side face. At its further end, each arm 19 carries a transversely extending spigot 21 which is arranged to engage with cam surfaces (to be described) formed upon a cam member 22 fixedly carried by adjacent fixed structure. The arm is spring-biassed to a median position (FIG. 5). Moreover, the mounting member 7 is spring-biassed outwardly, that is to say towards the presented display position.

Operation is described with reference to the various sub figures of FIG. 7. FIG. 7 (I) shows the spigots 21 in a position in which the movable panel 2 is unlocked and can be withdrawn sufficiently from the recess to allow it to swing about its hinged axis X—X and adopt the presentation position of FIGS. 3 and 4. Urging the movable panel toward the stowed position, that is to say by swinging it upwards about its hinged axis X—X so that it is in alignment with the hinge mounting member 7 and then applying an inward pressure, forces the spigots 21 to ride down a surface 23 of the cam member 22 (FIG. 7 (II)) and thereby bias the lever arms 19 anti-clockwise as drawn. Further inward movement allows the lever arms 19 to urge their spigots into a locking notch region 24 of the cam member as illustrated in FIG. 5 and also in FIG. 7 (III), in which the movable panel is locked in the stowed position.

Further inward urging of the movable panel against its spring bias causes the spigot 21 to ride down a further cam surface 25 on the cam member 22 (FIG. 7 (IV)) to reach a maximum depression of the lever arms 19 against their spring bias (FIG. 7 (V)) after which the spigots allow the lever arms to swing clockwise (FIG. 7 (VI)). On removal of the force effecting inward urging of the panel member, the biassing spring positively urges the panel member in an outward direction, the spigots 21 riding up yet a further cam surface 26 on the cam member until the position of FIG. 7 (VII) is reached. Subsequently, the position of FIG. 7 (VIII), which is similar to FIG. 7 (I), is adopted where the panel member can be withdrawn into the presentation position.

FIG. 8 illustrates a movable panel display area suitable for a military aircraft, sufficient information being presented on the major face 3 to allow a pilot to bring the aircraft safely home in the event of a failure of the permanently presented display. Presented are indications of air speed, altitude, engine RPM, rate of climb/descent and fuel remaining.

FIG. 9 illustrates an optional extra; in order to give a pilot or other operator confidence that the stowed display of the movable panel is functioning without needing to withdraw it, a further display of information is provided on the edge region 4. Conveniently, this provides the same information as the display on face 3 but in abbreviated digital form. Since it is on the edge region 4, it is displayed when the movable panel is in the stowed position.

FIGS. 10 and 11 illustrate alternative displays in which on the large face region 3 are provided push buttons 30 for control or calculation inputs. Again, on the small face region 4 a further display is provided giving an indication of the state of certain systems controlable by the display on the face region 3.

Naturally, flexible cables or other suitable connections connect the display areas with information sources and/or systems in the aircraft proper. Where the movable panel provides a emergency get-you-home information panel, they are connected with information sources which are separate from those supplying the permanently presented displays.

Although described particularly with respect to aircraft, the invention has far wider uses and has utilization wherever information and/or control displays are required to be presented only temporarily. In the aircraft embodiment, it is found that the invention has utility, particularly but not exclusively, wherever space for display is at a premium. As previously discussed, this can be in an aircraft cockpit, where the permanent display can malfunction and the temporary display of the invention can provide standby information sufficient to get the aircraft home. It also has utility where some displays need to be temporarily presented, for example to provide checks at certain times. Furthermore, the temporary display of the invention has use in aircraft maintenance bays where checks must be made but easy access to the display is otherwise precluded.

We claim:

1. A console assembly arranged to present a temporary display area including:
   a fixed structure;
   a movable panel having a face region and an edge region, the edge region being of substantially less area than the face region;
   mounting means for mounting the panel on the fixed structure, the mounting means comprising guideway means carried by the fixed structure, carriage means permanently engaged in the guideway means for movement back and forth with respect to the fixed structure, and pivot means connecting the panel to the carriage means;
   the carriage means, the panel and the guideway means being dimensioned so that the panel engages with and is constrained by the guideway means to lie in tandem with the carriage means for bodily movement to and from a stowed position, in which position only the edge region of the panel is presented, and during movement of the panel from said stowed position to a display position, the panel initially moves in tandem with the carriage means and subsequently swings with respect to the carriage means so that the face region is presented, thereby providing a temporary display area.

2. A console assembly according to claim 1, wherein locating means are provided to angularly locate the panel and the carriage means in tandem at least prior to engagement of the panel with the guideway means for stowage and also to locate the panel in an angled position during display.

3. A console assembly according to claim 1, wherein the fixed structure includes a permanently-presented display area and the movable panel lies in front of at least part of the permanently-presented area when in the display position.

4. A console assembly according to claim 3, wherein the fixed structure further includes a recess having a mouth formed in the permanently-presented display area, the mouth being blocked by the edge region of the panel, with the panel lying in the recess, when the panel is in the stowed position.

5. A console assembly according to claim 4, wherein the edge region of the panel provides a display area.

* * * * *